(12) United States Patent
Innes et al.

(10) Patent No.: US 8,042,165 B2
(45) Date of Patent: *Oct. 18, 2011

(54) METHOD AND SYSTEM FOR REQUESTING AND GRANTING MEMBERSHIP IN A SERVER FARM

(75) Inventors: Andrew Innes, Cambridge (GB); Chris Mayers, Oakington (GB); Mark James Syms, New Market (GB); David John Otway, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 1183 days.

This patent is subject to a terminal disclaimer.

(21) Appl. No.: 10/905,655

(22) Filed: Jan. 14, 2005

(65) Prior Publication Data

US 2006/0161974 A1 Jul. 20, 2006

(51) Int. Cl.
*G06F 7/04* (2006.01)
(52) U.S. Cl. ......................................................... 726/10
(58) Field of Classification Search .................. 726/10
See application file for complete search history.

(56) References Cited

U.S. PATENT DOCUMENTS

| | | | |
|---|---|---|---|
| 5,590,199 A | 12/1996 | Krajewski, Jr. et al. | |
| 5,684,950 A * | 11/1997 | Dare et al. ........................ | 726/10 |
| 5,812,668 A | 9/1998 | Weber | |
| 5,850,446 A | 12/1998 | Berger et al. | |
| 5,862,325 A | 1/1999 | Reed et al. | |
| 5,889,863 A | 3/1999 | Weber | |
| 5,923,756 A | 7/1999 | Shambroom | |
| 5,931,917 A | 8/1999 | Nguyen et al. | |
| 5,943,424 A | 8/1999 | Berger et al. | |
| 5,978,840 A | 11/1999 | Nguyen et al. | |
| 5,983,208 A | 11/1999 | Haller et al. | |
| 5,987,132 A | 11/1999 | Rowney | |
| 5,996,076 A | 11/1999 | Rowney et al. | |
| 6,002,767 A | 12/1999 | Kramer | |
| 6,026,379 A | 2/2000 | Haller et al. | |
| 6,064,736 A * | 5/2000 | Davis et al. ................... | 713/155 |

(Continued)

FOREIGN PATENT DOCUMENTS

EP 1385311 1/2004

(Continued)

OTHER PUBLICATIONS

International Preliminary Report to PCT/US2006/001306 dated Jul. 17, 2007.

(Continued)

*Primary Examiner* — Kambiz Zand
*Assistant Examiner* — Teshome Hailu
(74) *Attorney, Agent, or Firm* — Foley & Lardner LLP; John D. Lanza (57) ABSTRACT

A server transmits to a server in a server farm a request for membership in the server farm and a first nonce. The server derives a Kerberos service ticket and a Kerberos authenticator, responsive to generating a hash of the server farm name, a passphrase, the name of the server, the name of the server in the server farm, the first nonce, and a second nonce. The server transmits the Kerberos service ticket and the Kerberos authenticator to the server in the server farm. The server in the server farm authenticates the requesting server responsive to the received Kerberos service ticket and the Kerberos authenticator and a generated hash. The server in the server farm transmits, responsive to the authentication, a secret to the requesting server.

15 Claims, 6 Drawing Sheets

U.S. PATENT DOCUMENTS

| | | | |
|---|---|---|---|
| 6,072,870 | A | 6/2000 | Nguyen et al. |
| 6,073,241 | A * | 6/2000 | Rosenberg et al. ............... 726/3 |
| 6,088,451 | A | 7/2000 | He et al. |
| 6,088,717 | A | 7/2000 | Reed et al. |
| 6,119,105 | A | 9/2000 | Williams |
| 6,163,772 | A | 12/2000 | Kramer et al. |
| 6,178,409 | B1 | 1/2001 | Weber et al. |
| 6,253,027 | B1 | 6/2001 | Weber et al. |
| 6,272,632 | B1 | 8/2001 | Carman et al. |
| 6,275,942 | B1 | 8/2001 | Bernhard et al. |
| 6,289,382 | B1 | 9/2001 | Bowman-Amuah |
| 6,304,915 | B1 | 10/2001 | Nguyen et al. |
| 6,308,273 | B1 | 10/2001 | Goertzel et al. |
| 6,324,525 | B1 | 11/2001 | Kramer et al. |
| 6,332,163 | B1 | 12/2001 | Bowman-Amuah |
| 6,339,832 | B1 | 1/2002 | Bowman-Amuah |
| 6,345,288 | B1 | 2/2002 | Reed et al. |
| 6,363,363 | B1 | 3/2002 | Haller et al. |
| 6,373,950 | B1 | 4/2002 | Rowney |
| 6,434,568 | B1 | 8/2002 | Bowman-Amuah |
| 6,434,628 | B1 | 8/2002 | Bowman-Amuah |
| 6,438,594 | B1 | 8/2002 | Bowman-Amuah |
| 6,442,748 | B1 | 8/2002 | Bowman-Amuah |
| 6,477,580 | B1 | 11/2002 | Bowman-Amuah |
| 6,477,665 | B1 | 11/2002 | Bowman-Amuah |
| 6,496,850 | B1 | 12/2002 | Bowman-Amuah |
| 6,502,102 | B1 | 12/2002 | Haswell et al. |
| 6,502,213 | B1 | 12/2002 | Bowman-Amuah |
| 6,523,027 | B1 | 2/2003 | Underwood |
| 6,529,909 | B1 | 3/2003 | Bowman-Amuah |
| 6,529,948 | B1 | 3/2003 | Bowman-Amuah |
| 6,539,396 | B1 | 3/2003 | Bowman-Amuah |
| 6,549,949 | B1 | 4/2003 | Bowman-Amuah |
| 6,550,057 | B1 | 4/2003 | Bowman-Amuah |
| 6,571,282 | B1 | 5/2003 | Bowman-Amuah |
| 6,578,068 | B1 | 6/2003 | Bowman-Amuah |
| 6,601,192 | B1 | 7/2003 | Bowman-Amuah |
| 6,601,233 | B1 | 7/2003 | Underwood |
| 6,601,234 | B1 | 7/2003 | Bowman-Amuah |
| 6,606,660 | B1 | 8/2003 | Bowman-Amuah |
| 6,606,744 | B1 | 8/2003 | Mikurak |
| 6,609,128 | B1 | 8/2003 | Underwood |
| 6,615,199 | B1 | 9/2003 | Bowman-Amuah |
| 6,615,253 | B1 | 9/2003 | Bowman-Amuah |
| 6,629,081 | B1 | 9/2003 | Cornelius et al. |
| 6,633,878 | B1 | 10/2003 | Underwood |
| 6,636,242 | B2 | 10/2003 | Bowman-Amuah |
| 6,640,238 | B1 | 10/2003 | Bowman-Amuah |
| 6,640,244 | B1 | 10/2003 | Bowman-Amuah |
| 6,640,249 | B1 | 10/2003 | Bowman-Amuah |
| 6,643,774 | B1 * | 11/2003 | McGarvey ............... 713/155 |
| 6,671,818 | B1 | 12/2003 | Mikurak |
| 6,701,514 | B1 | 3/2004 | Haswell et al. |
| 6,704,873 | B1 | 3/2004 | Underwood |
| 6,715,145 | B1 | 3/2004 | Bowman-Amuah |
| 6,718,535 | B1 | 4/2004 | Underwood |
| 6,732,269 | B1 | 5/2004 | Baskey et al. |
| 6,742,015 | B1 | 5/2004 | Bowman-Amuah |
| 6,757,710 | B2 | 6/2004 | Reed |
| 6,792,534 | B2 * | 9/2004 | Medvinsky ............... 713/171 |
| 6,826,696 | B1 | 11/2004 | Chawla et al. |
| 6,842,906 | B1 | 1/2005 | Bowman-Amuah |
| 6,850,252 | B1 | 2/2005 | Hoffberg |
| 6,871,346 | B1 | 3/2005 | Kumbalimutt et al. |
| 6,907,546 | B1 | 6/2005 | Haswell et al. |
| 6,993,652 | B2 | 1/2006 | Medvinsky |
| 6,996,817 | B2 | 2/2006 | Birum et al. |
| 7,069,234 | B1 | 6/2006 | Cornelius et al. |
| 7,100,195 | B1 | 8/2006 | Underwood |
| 7,117,504 | B2 | 10/2006 | Smith et al. |
| 7,124,101 | B1 | 10/2006 | Mikurak |
| 7,130,807 | B1 | 10/2006 | Mikurak |
| 7,130,839 | B2 * | 10/2006 | Boreham et al. ............... 707/3 |
| 7,167,844 | B1 | 1/2007 | Leong et al. |
| 7,287,156 | B2 * | 10/2007 | McGarvey ............... 713/153 |
| 2002/0091757 | A1 * | 7/2002 | Cuomo et al. ............... 709/203 |
| 2002/0091926 | A1 * | 7/2002 | Fukutomi ............... 713/170 |
| 2002/0112152 | A1 | 8/2002 | VanHeyningen et al. |
| 2002/0133723 | A1 | 9/2002 | Tait |
| 2002/0138551 | A1 | 9/2002 | Erickson |
| 2002/0147927 | A1 | 10/2002 | Tait |
| 2003/0018913 | A1 | 1/2003 | Brezak et al. |
| 2003/0023845 | A1 | 1/2003 | VanHeyningen |
| 2003/0084165 | A1 | 5/2003 | Kjellberg et al. |
| 2003/0149880 | A1 | 8/2003 | Shamsaasef et al. |
| 2003/0182431 | A1 | 9/2003 | Sturniolo et al. |
| 2003/0188193 | A1 * | 10/2003 | Venkataramappa ........ 713/201 |
| 2004/0107360 | A1 | 6/2004 | Herrmann et al. |
| 2004/0131187 | A1 * | 7/2004 | Takao et al. ............... 380/255 |
| 2005/0091171 | A1 * | 4/2005 | Grobman ............... 705/64 |
| 2005/0149726 | A1 | 7/2005 | Joshi et al. |
| 2005/0262357 | A1 | 11/2005 | Araujo et al. |
| 2006/0015724 | A1 * | 1/2006 | Naftali et al. ............... 713/168 |
| 2006/0137001 | A1 * | 6/2006 | Foster et al. ............... 726/10 |
| 2006/0161975 | A1 * | 7/2006 | Diez et al. ............... 726/18 |
| 2007/0107048 | A1 | 5/2007 | Halls et al. |
| 2007/0179955 | A1 | 8/2007 | Croft et al. |

FOREIGN PATENT DOCUMENTS

| | | |
|---|---|---|
| WO | WO-2006/076618 | 7/2006 |

OTHER PUBLICATIONS

Written Opinion of the International Searching Authority to PCT/US2006/001306 dated Jul. 14, 2007.

International Search Report on PCT/US2006/001306 dated Jul. 17, 2007.

Neuman et al., The Kerberos Network Authentication Service (V5), Internet draft, Sep. 2004.

Non-Final Office Action for U.S. Appl. No. 10/905,654, dated May 13, 2008.

* cited by examiner

METHOD AND SYSTEM FOR REQUESTING AND GRANTING MEMBERSHIP IN A SERVER FARM

FIELD OF THE INVENTION

The present invention relates to a method and system for requesting and granting membership in a server farm.

BACKGROUND OF THE INVENTION

Conventionally, in a networked environment, a server farm may use pre-existing security domains to permit servers within the server farm to authenticate themselves to each other. However, not all environments support or normally provide security domains. One example of a popular environment that does not normally provide security domains is the Unix/Linux operating system.

Environments that support security domains may comprise multiple types of security domains. In such environments, authentication across multiple security domains may not be possible. For example, certain types of security domains may not allow authentication of other types of security domains. In some instances, certain domains within the environment may allow authentication while other domains do not.

Environments that support security domains may also comprise multiple types of servers, some of which support security domains while others do not. Further, a domain in the environment may comprise both servers that allow authentication and servers that do not allow authentication. In such environments, authentication from one server to another may not be possible.

A method of authenticating a server in a server farm by a second server in the server farm would be desirable in environments that do not support or normally provide security domains and in environments comprising multiple varying security domains or servers. A method of requesting and granting membership in a server farm would be desirable in such environments to facilitate the secure construction of the server farm.

BRIEF SUMMARY OF THE INVENTION

The present invention provides for authentication of servers in a server farm, regardless of the type of security domains or the type of servers in the server farm. A server may authenticate itself to any other server in the server farm, even where the two servers belong to disparate security domains. Further, authentication may occur without the use of a central key distribution center.

In one aspect, the present invention relates to a method for requesting membership in a server farm. A requesting server receives a name of the server farm, a passphrase, and a name of a server in the server farm. The requesting server transmits to the server in the server farm a request for membership in the server farm and a first nonce. The requesting server receives an acknowledgement of the request and a second nonce. The requesting server generates a hash of the server farm name, the passphrase, the name of the requesting server, the name of the server in the server farm, the first nonce, and the second nonce. The requesting server derives a Kerberos service ticket and a Kerberos authenticator responsive to the generated hash. The requesting server transmits the Kerberos service ticket and the Kerberos authenticator to the server in the server farm.

In another aspect, the present invention relates to a system for requesting membership in a server farm. A receiver receives a name of the server farm, a passphrase, and a name of a server in the server farm. A transmitter, in communication with the receiver, transmits to the server in the server farm a request for membership in the server farm and a first nonce. A generator in communication with the receiver and the transmitter, generates a hash of the server farm name, the passphrase, the name of the receiver, the name of the server in the server farm, the first nonce and a second nonce received by the receiver in response to the transmitted request for membership in the server farm, the generator deriving a Kerberos service ticket and a Kerberos authenticator responsive to the generated hash. The transmitter transmits the Kerberos service ticket and the Kerberos authenticator to the server in the server farm.

In one aspect, the present invention relates to a method for granting membership in a server farm. A server in the server farm receives a request for membership in the server farm and a Kerberos service ticket and a Kerberos authenticator. The server in the server farm generates a hash of a name of the server farm, a passphrase, the name of the requester, the name of the server, a first nonce, and a second nonce. The server in the server farm authenticates the requester, responsive to the received Kerberos service ticket and the Kerberos authenticator and the generated hash. The server in the server farm transmits, responsive to the authentication, a secret to the requester.

In another aspect, the present invention relates to a system for granting membership in a server farm. A receiver receives a request for membership in the server farm and a first hash. A generator in communication with the receiver generates a hash of a name of the server farm, a passphrase, the name of the requester, the name of the receiver, a first nonce, and a second nonce. A transmitter, in communication with the receiver and the generator, transmits a secret to the requester, responsive to an authentication of the requester responsive to the received Kerberos service ticket and the Kerberos authenticator and the generated hash.

BRIEF DESCRIPTION OF THE DRAWINGS

These and other aspects of the invention will be readily apparent from the detailed description below and the appended drawings, which are meant to illustrate and not to limit the invention, and in which.

DETAILED DESCRIPTION OF THE INVENTION

One embodiment of the present invention is applicable to a distributed networking environment where a first server in a server farm authenticates another server in the server farm.

Prior to discussing the specifics of the present invention, it may be helpful to discuss some of the network environments in which the illustrative embodiment of the present invention may be employed.

Figure 1A:
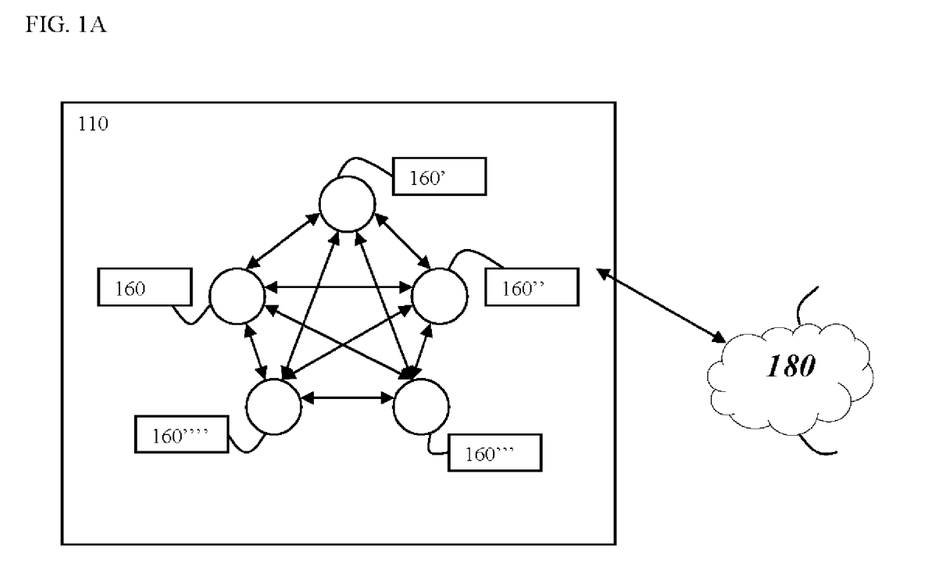
FIG. 1A is a block diagram of an embodiment of a server farm.

Referring now to FIG. 1A, one embodiment of a server farm 110 is shown. The server farm 110 is a logical group of one or more servers 160, 160', 160", 160''', 160'''' (hereafter referred to generally as server 160 or servers 160) that are administered as a single entity. The servers 160 within each farm 110 can be heterogeneous. That is, one or more of the servers 160 can operate according to one type of operating system platform (e.g., WINDOWS NT, manufactured by Microsoft Corp. of Redmond, Wash.), while one or more of the other servers 160 can operate on according to another type of operating system platform (e.g., Unix or Linux). The servers 160 comprising each server farm 110 do not need to be physically proximate to each other server 160 in its farm 110. Thus, the group of servers 160 logically grouped as a server farm 110 may be interconnected using a wide-area network (WAN) connection or medium-area network (MAN) connection. For example, a server farm 110 may include servers 160 physically located in different regions of a state, city, campus, or room. Data transmission speeds between servers 160 in the server farm 110 can be increased if the servers 160 are connected using a local-area network (LAN) connection or some form of direct connection.

Figure 1B:
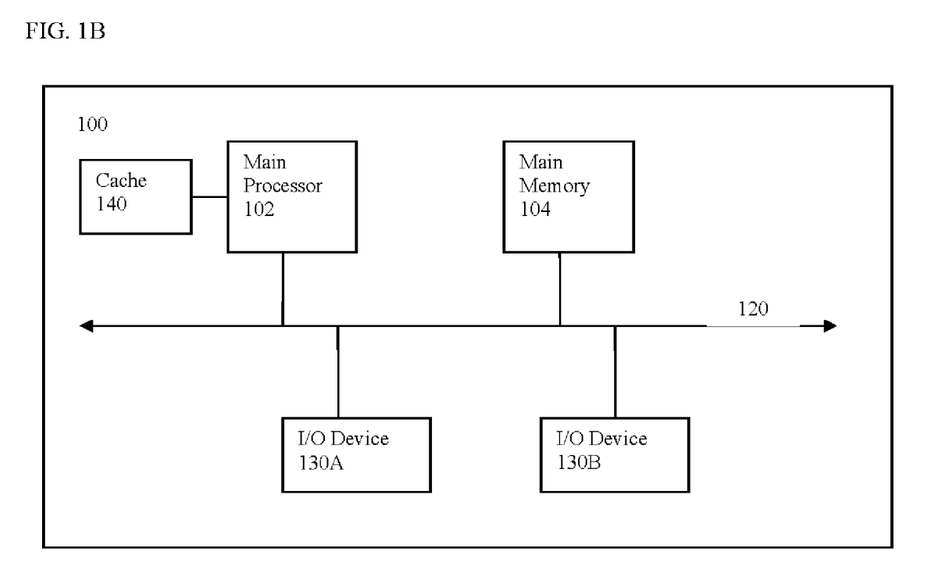
FIG. 1B and FIG. 1C are block diagrams depicting one embodiment of a typical computer useful as a server in the server farm.
Figure 1C:
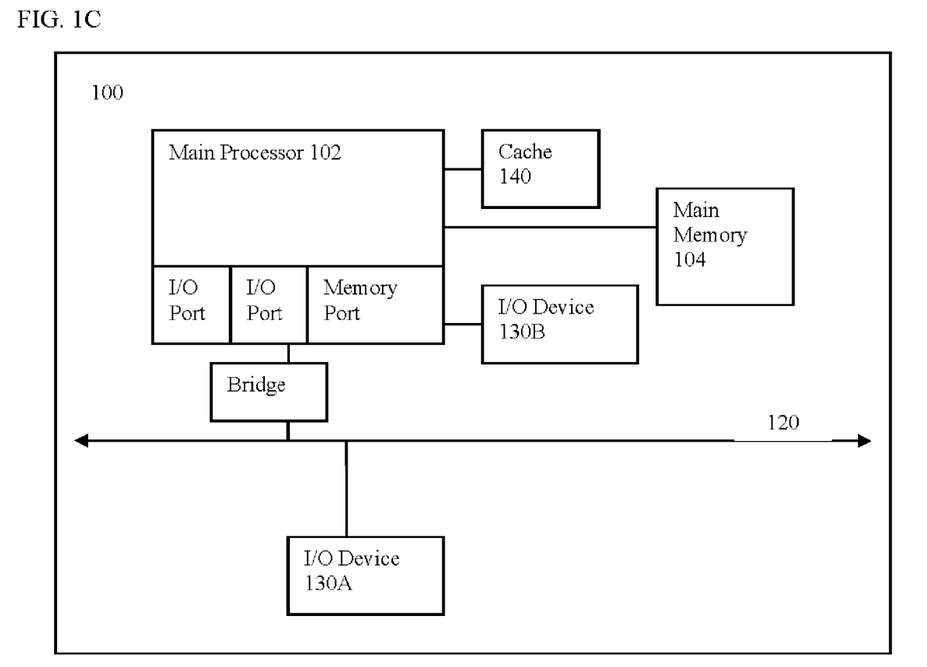

FIG. 1B and FIG. 1C depict block diagrams of a typical computer 100 useful as a server in the server farm 110. In many embodiments, the servers 160 are provided as personal computers or computer servers, of the sort manufactured by the Hewlett-Packard Corporation of Palo Alto, Calif. or the Dell Corporation of Round Rock, Tex. As shown in FIG. 1B and FIG. 1C, each computer 100 includes a central processing unit 102, and a main memory unit 104. Each computer 100 may also include other optional elements, such as one or more input/output devices 130a-130n (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 1B, the processor 102 communicates with main memory 104 via a system bus 120 (described in more detail below). FIG. 1C depicts an embodiment of a computer system 100 in which the processor communicates directly with main memory 104 via a memory port. For example, in FIG. 1C, the main memory 104 may be DRDRAM.

FIG. 1B and FIG. 1C depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1B, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1C depicts an embodiment of a computer system 100 in which the main processor 102 communicates directly with I/O device 130b via HyperTransport, Rapid I/O, or InfiniBand. FIG. 1C also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, DVD-RW drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIG. 1B and FIG. 1C typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

A server in the server farm 110 may also be any personal computer (e.g., 286-based, 386-based, 486-based, Pentium-based, Pentium II-based, or Macintosh computer), Windows-based terminal, Network Computer, wireless device, information appliance, RISC Power PC, X-device, workstation, mini computer, main frame computer, personal digital assistant, or other computing device. Windows-oriented platforms supported by the server can include, without limitation, WINDOWS 3.x, WINDOWS 95, WINDOWS 98, WINDOWS NT 3.51, WINDOWS NT 4.0, WINDOWS 2000, WINDOWS CE, WINDOWS ME, WINDOWS XP, WINDOWS Longhorn, MAC/OS, Java, and UNIX. The server can include a visual display device (e.g., a computer monitor), a data entry device (e.g., a keyboard), persistent or volatile storage (e.g., computer memory) for storing downloaded application programs, a processor, and a mouse. Execution of a communication program allows the server to participate in a distributed computer system model.

Figure 2:
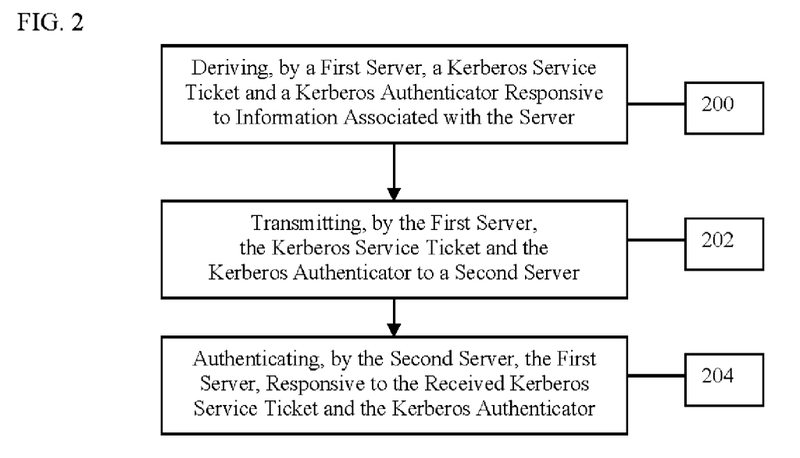
FIG. 2 is a flow diagram depicting one embodiment of the steps taken to authenticate a first server in a server farm, by a second server in the server farm.

Referring now to FIG. 2, a flow diagram depicts one embodiment of the steps taken to authenticate a first server in a server farm 110, by a second server in the server farm 110. In brief overview, a first server derives a Kerberos service ticket and a Kerberos authenticator responsive to information associated with the server farm (step 200). The first server transmits the Kerberos service ticket and the Kerberos authenticator to a second server in the server farm (step 202). The second server authenticates the first server, responsive to the received Kerberos service ticket and the Kerberos authenticator (step 204).

As is well known, in a typical Kerberos environment a Key Distribution Center (KDC) is deployed on the network and provides a Ticket Granting Service. The KDC contains principals for all servers in the server farm with each server knowing its corresponding long-term secret key. Request for Comment 1510, published by the Internet Engineering Task Force Network Working Group, (referred to as "RFC 1510") describes the use of Kerberos to generate Kerberos service tickets. As is well-known, an authenticator is a record containing information that can be shown to have been recently generated using the session key known only by the client and server, and a ticket is a record that helps a client authenticate itself to a server. The ticket contains the client's identity, a session key, a timestamp, and other information, all sealed using the server's secret key. The ticket serves to authenticate an entity only when presented together with a fresh authenticator.

In one embodiment of the present invention, the Kerberos service ticket is indistinguishable from a typical Kerberos ticket generated by a KDC although the process for generating the ticket differs. In this embodiment, the Kerberos service ticket generated by the first server differs from a Kerberos service ticket generated by a KDC in that the encrypted component of the ticket is encrypted using the key derived from a secret associated with the server farm and not from a long-term secret server key shared only with a KDC. In another embodiment, the key derivation process includes information that is specific to each connection as well as including a secret associated with the server farm.

In one embodiment, the first server generating a Kerberos service ticket uses a typical method of deriving a Kerberos service ticket as described in RFC 1510 but differs from a typical derivation of a Kerberos service ticket in that the Kerberos service ticket is generated by the first server and not a trusted third party such as a Key Distribution Center.

The server in the server farm 110 derives a Kerberos service ticket and a Kerberos authenticator responsive to information associated with the server farm 110 (step 200). In one embodiment, the server derives the Kerberos service ticket 110 responsive to an identity of a server in the server farm 110. In another embodiment, the server derives the Kerberos service ticket responsive to a name of a server in the server farm 110. In other embodiments, the server derives the Kerberos service ticket responsive to a secret associated with the server farm.

The server transmits the Kerberos service ticket and the Kerberos authenticator to a second server in the server farm 110. In some embodiments, the server 160 transmits the Kerberos service ticket and the Kerberos authenticator to the second server over Secure Sockets Layer/Transport Layer Security (SSL/TLS). In some of these embodiments, the server uses Kerberos to transmit the Kerberos service ticket and the Kerberos authenticator over SSL/TLS.

As is well known, TLS defines standard cipher suites that use Kerberos for authentication instead of other methods. The Kerberos cipher suites for TLS are defined in Request For Comments 2712, published by the Internet Engineering Task Force Network Working Group, (referred to as "RFC 2712"), a standard enabling the use of Kerberos credentials to achieve mutual authentication and to establish a master secret which is subsequently used to secure communication. In one embodiment, TLS is implemented to make use of this standard.

In other embodiments, the server transmits the Kerberos service ticket and the Kerberos authenticator to the second server using the Generic Security Services Application Program Interface (GSSAPI). In some of these embodiments, the server uses Kerberos to transmit the Kerberos service ticket and the Kerberos authenticator over GSSAPI. In one of these embodiments, Kerberos authentication over GSSAPI is implemented as described in Request For Comments 1964, published by the Internet Engineering Task Force Network Working Group (referred to as "RFC 1964").

Upon receipt of the Kerberos service ticket and the Kerberos authenticator, the server in the server farm authenticates the server transmitting the Kerberos service ticket and the Kerberos authenticator responsive to the Kerberos service ticket and the Kerberos authenticator. In one embodiment, the two servers mutually authenticate each other. In this embodiment, the first server transmits a Kerberos service ticket and a Kerberos authenticator to the second server, which responds with a Kerberos authentication reply.

Figure 3:
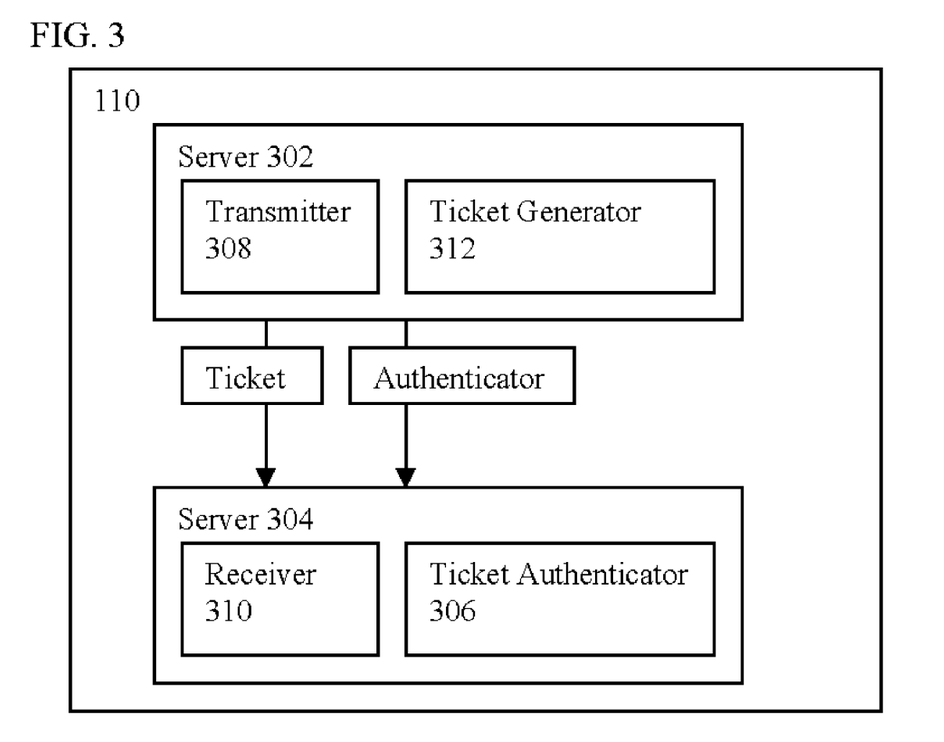
FIG. 3 is a block diagram of an embodiment of a network in which servers in a server farm may authenticate other servers in the server farm.

Referring now to FIG. 3, a block diagram depicts an embodiment of a network in which servers in a server farm may authenticate other servers within the server farm. The server 302 derives a Kerberos service ticket responsive to information associated with the server farm 110. In one embodiment, the server 302 further comprises a ticket generator 312. In some embodiments, the ticket generator 312 comprises hardware. In some of these embodiments, the first server may comprise a hardware accelerator. In others of these embodiments, the ticket generator may comprise an integrated circuit. In still others of these embodiments, the ticket generator 312 comprises software.

In some embodiments, the second server 304 further comprises a ticket authenticator 306. In some embodiments, the ticket authenticator 306 comprises hardware. In some of these embodiments, the second server 304 may comprise a hardware accelerator. In others of these embodiments, the ticket authenticator 306 may comprise an integrated circuit. In still others of these embodiments, the ticket authenticator 306 comprises software.

In some embodiments, the server 302 comprises a transmitter 308. In one of these embodiments, the transmitter 308 comprises a wireless card. In this embodiment, the transmitter 308 may comprise a wireless 802.11b/g card. In other embodiments, the transmitter 308 may comprise using a variety of connections including standard telephone lines, LAN or WAN links (e.g., T1, T3, 56 kb, X.25), broadband connections (ISDN, Frame Relay, ATM), and wireless connections. Connections may be established using a variety of lower layer communication protocols (e.g., TCP/IP, IPX, SPX, NetBIOS, Ethernet, RS232, direct asynchronous connections). In still other embodiments, the transmitter 308 comprises an integrated circuit. In yet other embodiments, the transmitter 308 comprises special purpose hardware.

In some embodiments, the server 304 comprises a receiver 310. In one of these embodiments, the receiver 310 comprises a wireless card. In this embodiment, the receiver 310 may comprise a wireless 802.11b/g card. In other embodiments, the receiver 310 may comprise using a variety of connections including standard telephone lines, LAN or WAN links (e.g., T1, T3, 56 kb, X.25), broadband connections (ISDN, Frame Relay, ATM), and wireless connections. Connections may be established using a variety of lower layer communication protocols (e.g., TCP/IP, IPX, SPX, NetBIOS, Ethernet, RS232, direct asynchronous connections). In still other embodiments, the receiver 310 comprises an integrated circuit. In yet other embodiments, the receiver 310 comprises special purpose hardware.

Figure 4:
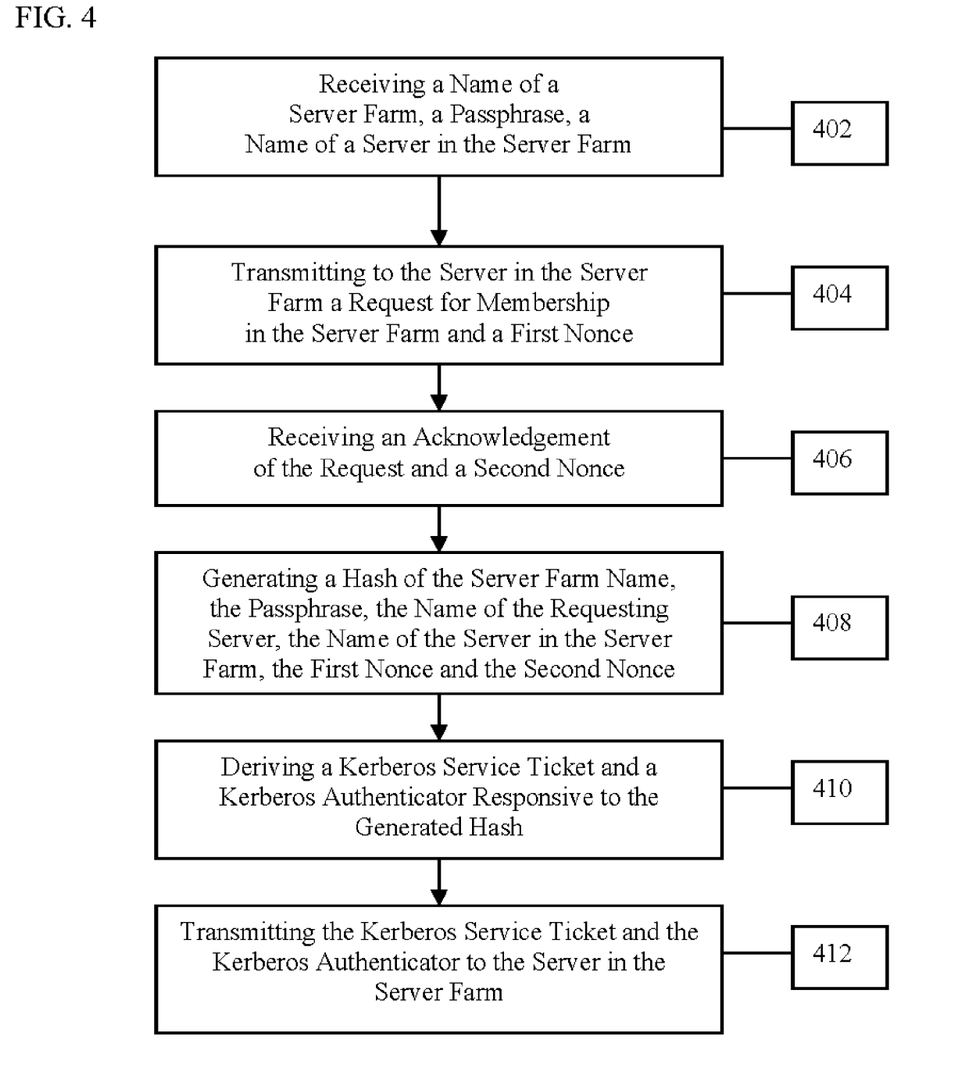
FIG. 4 is a flow diagram depicting one embodiment of the steps taken to request membership in a server farm.

Referring now to FIG. 4, a flow diagram depicts one embodiment of the steps taken to request membership in a server farm. In brief overview, a requesting server receives a name of the server farm, a passphrase, and a name of a server in the server farm (step 402). The requesting server transmits to the server in the server farm a request for membership in the server farm and a first nonce (step 404). The requesting server receives an acknowledgement of the request and a second nonce. (step 406). The requesting server generates a hash of the server farm name, the passphrase, the name of the requesting server, the name of the server in the server farm, the first nonce, and the second nonce (step 408). The requesting server derives a Kerberos service ticket and a Kerberos authenticator responsive to the generated hash (step 410). The requesting server transmits the Kerberos service ticket and the Kerberos authenticator to the server in the server farm (step 412).

A requesting server receives a name of the server farm, a passphrase, and a name of a server in the server farm (step 402). The requesting server transmits a request for membership in the server farm (step 404). In one embodiment, the requesting server transmits a command to start communications with the server in the server farm.

In one embodiment, the requesting server receives the name of the server farm, the passphrase, and the name of the server in the server farm from an administrator of the server farm. In some embodiments, the administrator is a human administrator. In one embodiment, the requesting server receives a fully-qualified pathname of the server farm. In another embodiment, the requesting server receives a fully-qualified pathname of the server in the server farm.

The requesting server receives an acknowledgement of the request and a second nonce (step 406). In some embodiments, the requesting server receives the acknowledgement and the second nonce from the server in the server farm.

In some embodiments, the requesting server generates a hash of the server farm name, the passphrase, the name of the requesting server, the name of the server in the server farm, the first nonce and the second nonce (step 408). In one of these embodiments, the requesting server generates an HMAC-SHA1 keyed hash of the server farm name, the passphrase, the name of the requesting server, the name of the server in the server farm, the first nonce and the second nonce. In another of these embodiments, the requesting server generates an HMAC-SHA-256 keyed hash of the server farm name, the passphrase, the name of the requesting server, the name of the server in the server farm, the first nonce and the second nonce. In still others of these embodiments, the requesting server generates an HMAC-MD5 keyed hash of the server farm name, the passphrase, the name of the requesting server, the name of the server in the server farm, the first nonce and the second nonce. In embodiments using a keyed hash function, the hash key is derived from the passphrase. In some embodiments, the requesting server generates an HMAC-SHA1 keyed hash of the server farm name with the passphrase as the key.

The requesting server derives a Kerberos service ticket and a Kerberos authenticator responsive to the generated hash (step 410). In one embodiment, the Kerberos service ticket is indistinguishable from a typical Kerberos ticket generated by a KDC although the process for generating the ticket differs. In this embodiment, the Kerberos service ticket generated by the requesting server differs from a Kerberos service ticket generated by a KDC in that the encrypted component of the ticket is encrypted using the generated hash and not a long-term secret server key shared only with a KDC.

The requesting server transmits the Kerberos service ticket and the Kerberos authenticator to the server in the server farm (step 412). In some embodiments, the requesting server transmits the Kerberos service ticket and the Kerberos authenticator to the server in the server farm over Secure Sockets Layer/Transport Layer Security (SSL/TLS). In some of these embodiments, the requesting server uses Kerberos to transmit the Kerberos service ticket and the Kerberos authenticator over SSL/TLS. In one of these embodiments, Kerberos authentication over SSL/TLS is implemented as described in RFC 2712. In other embodiments, the requesting server transmits the Kerberos service ticket and the Kerberos authenticator to the server in the server farm using the Generic Security Services Application Program Interface (GSSAPI). In some of these embodiments, the requesting server uses Kerberos to transmit the Kerberos service ticket and the Kerberos authenticator over GSSAPI. In one of these embodiments, Kerberos authentication over GSSAPI is implemented as described in RFC 1964.

Figure 5:
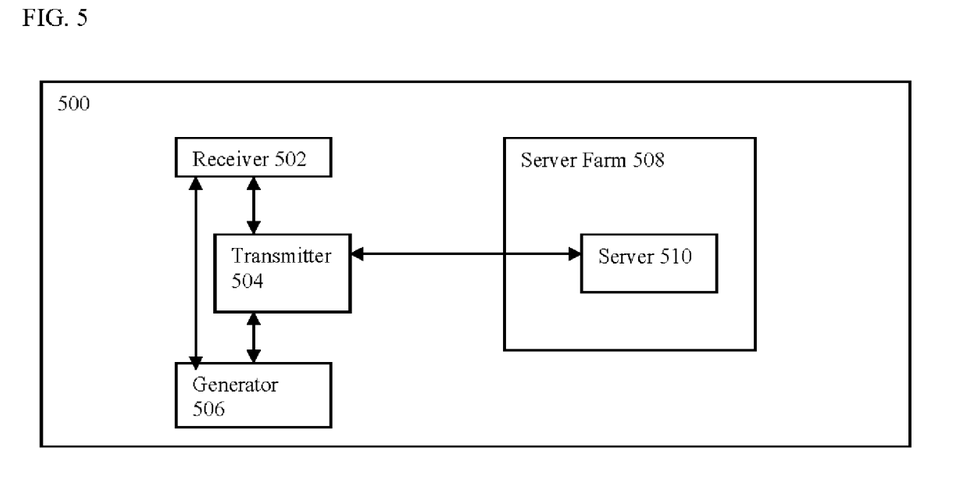
FIG. 5 is a block diagram depicting one embodiment of a system for requesting membership in a server farm.

Referring now to FIG. 5, a block diagram depicts one embodiment of a system for requesting membership in a server farm, including a receiver 502, a transmitter 504, a generator 506, a server farm 508, and a server 510. In brief overview, the receiver 502 receives a name of the server farm 508, a passphrase, and a name of a server 510 in the server farm 508. The transmitter 504, in communication with the receiver 502, transmits to the server 510 in the server farm 508 a request for membership in the server farm 508 and a first nonce. A generator 506, in communication with the receiver 502 and the transmitter 504, generates a hash of the name of the server farm 508, the passphrase, the name of the receiver, the name of the server in the server farm, the first nonce and a second nonce received by the receiver 502 in response to the transmitted request for membership in the server farm 508. The generator 506 derives a Kerberos service ticket and a Kerberos authenticator responsive to the generated hash, the transmitter 504 transmitting the Kerberos service ticket and the Kerberos authenticator to the server 510 in the server farm 508.

In some embodiments, the transmitter 504 comprises a wireless card. In this embodiment, the transmitter 504 may comprise a wireless 802.11b/g card. In other embodiments, the transmitter 504 may comprise using a variety of connections including standard telephone lines, LAN or WAN links (e.g., T1, T3, 56 kb, X.25), broadband connections (ISDN, Frame Relay, ATM), and wireless connections. Connections may be established using a variety of lower layer communication protocols (e.g., TCP/IP, IPX, SPX, NetBIOS, Ethernet, RS232, direct asynchronous connections). In still other embodiments, the transmitter 504 comprises an integrated circuit. In yet other embodiments, the transmitter 504 comprises special purpose hardware.

In some embodiments, the server 510 comprises a receiver. In one of these embodiments, the receiver comprises a wireless card. In this embodiment, the receiver may comprise a wireless 802.11b/g card. In other embodiments, the receiver may comprise using a variety of connections including standard telephone lines, LAN or WAN links (e.g., T1, T3, 56 kb, X.25), broadband connections (ISDN, Frame Relay, ATM), and wireless connections. Connections may be established using a variety of lower layer communication protocols (e.g., TCP/IP, IPX, SPX, NetBIOS, Ethernet, RS232, direct asynchronous connections). In still other embodiments, the receiver comprises an integrated circuit. In yet other embodiments, the receiver comprises special purpose hardware.

Figure 6:
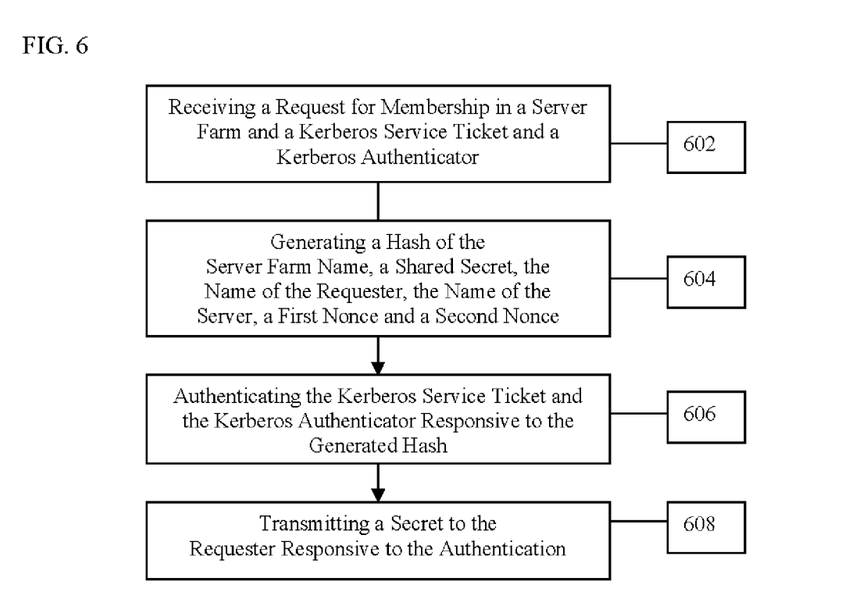
FIG. 6 is a flow diagram depicting one embodiment of the steps taken to grant membership in a server farm.

Referring now to FIG. 6, a flow diagram depicts one embodiment of the steps taken to grant membership in a server farm. In brief overview, a server in the server farm receives a request for membership in the server farm and a Kerberos service ticket and a Kerberos authenticator (step 602). The server in the server farm generates a hash of a name of the server farm, a passphrase, the name of the requester, the name of the server, a first nonce, and a second nonce (step 604). The server in the server farm authenticates the requesting server responsive to the Kerberos service ticket and the Kerberos authenticator and the generated hash (step 606). The server in the server farm transmits a secret to the requester, responsive to the authentication (step 608).

A server in the server farm receives a request for membership in the server farm and a Kerberos service ticket and a Kerberos authenticator (step 602). The server in the server farm generates a hash of a name of the server farm, the passphrase, the name of the requester, the name of the server, a first nonce, and a second nonce (step 604). In one embodiment, the server in the server farm generates an HMAC-SHA1 keyed hash of the name of the server farm, the passphrase, the name of the requester, the name of the server, the first nonce, and the second nonce. In another embodiment, the server in the server farm generates an HMAC-SHA-256 keyed hash of the name of the server farm, the passphrase, the name of the requester, the name of the server, the first nonce, and the second nonce. In yet another embodiment, the server in the server farm generates an HMAC-MD5 keyed hash of the name of the server farm, the passphrase, the name of the requester, the name of the server, the first nonce, and the second nonce. In embodiments using a keyed hash function, the hash key is derived from the passphrase. In one embodiment, the server in the server farm generates an HMAC-SHA1 keyed hash of the server farm name with the passphrase as the key.

The server in the server farm authenticates the requesting server responsive to the Kerberos service ticket and the Kerberos authenticator and the generated hash (step 606). In one embodiment, the two servers mutually authenticate each other. In this embodiment, the requesting server transmits a Kerberos service ticket and a Kerberos authenticator to the server in the server farm, which responds with a Kerberos authentication reply.

In one embodiment, the server in the server farm transmits a secret to the requester responsive to the authentication (step 608). In another embodiment, the server in the server farm does not transmit the secret to the requester if the authentication fails. In one embodiment, the server in the server farm transmits a 128-bit secret. In another embodiment, the server in the server farm transmits a 256-bit secret. In still another embodiment, the server in the server farm transmits a 512-bit secret. In some embodiments, the server in the server farm transmits the secret to the requester encrypted using the session key contained in the Kerberos service ticket.

Figure 7:
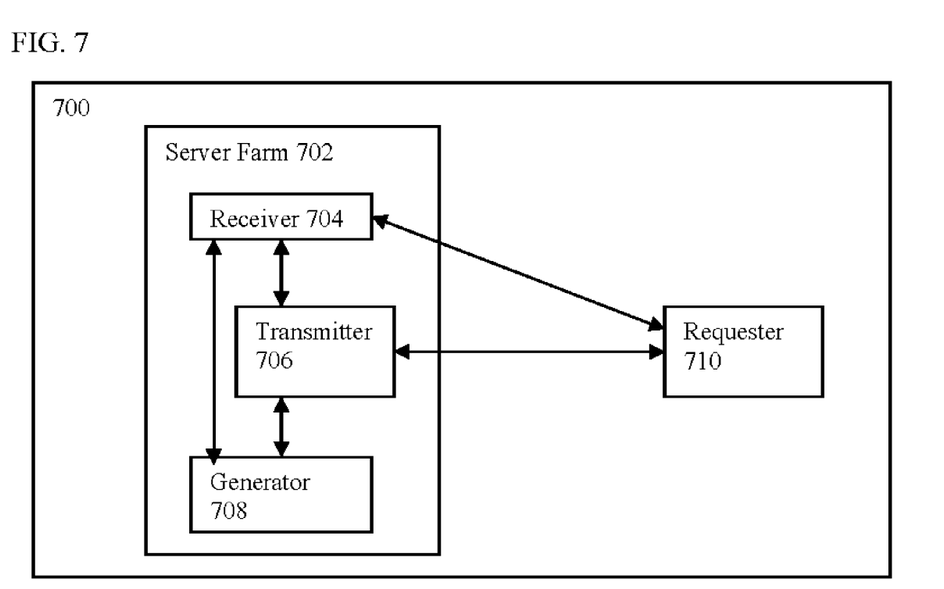
FIG. 7 is a block diagram depicting one embodiment of a system for granting membership in a server farm.

Referring now to FIG. 7, a block diagram depicts one embodiment of a system for granting membership in a server farm, including a server farm 702, a receiver 704, a transmitter 706, a generator 708, and a requester 710. In brief overview, the receiver 704, receives a request for membership in the server farm 702 and a Kerberos service ticket and a Kerberos authenticator. The generator 708, in communication with the receiver 704, generates a hash of a name of the server farm 702, a passphrase, the name of the requester 710, the name of the receiver 704, a first nonce, and a second nonce. The transmitter 706, in communication with the receiver 704 and the generator 708, transmitting a secret to the requester 710 responsive to an authentication of the Kerberos service ticket and the Kerberos authenticator responsive to the generated hash.

In one embodiment, the transmitter 706 comprises a wireless card. In this embodiment, the transmitter 706 may comprise a wireless 802.11b/g card. In other embodiments, the transmitter 706 may comprise using a variety of connections including standard telephone lines, LAN or WAN links (e.g., T1, T3, 56 kb, X.25), broadband connections (ISDN, Frame Relay, ATM), and wireless connections. Connections may be established using a variety of lower layer communication protocols (e.g., TCP/IP, IPX, SPX, NetBIOS, Ethernet, RS232, direct asynchronous connections). In still other embodiments, the transmitter 706 comprises an integrated circuit. In yet other embodiments, the transmitter 706 comprises special purpose hardware.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for requesting membership in a server farm, the method comprising:

receiving, by a requesting server belonging to a first security domain, a name of a server farm comprising at least two servers, a passphrase, and a name of one of the at least two servers in the server farm;

transmitting, by the requesting server, to the one of the at least two servers in the server farm a request for membership in the server farm and a first nonce, wherein the one of the at least two servers in the server farm belongs to a second security domain;

receiving by the requesting server, an acknowledgement of the request and a second nonce;

generating, by the requesting server responsive to the acknowledgement of the request for membership in the server farm, a hash of the server farm name, the passphrase, the name of the requesting server, the name of the one of the at least two servers in the server farm, the first nonce, and the second nonce;

generating, by the requesting server, a Kerberos service ticket and a Kerberos authenticator;

encrypting, by the requesting server, a portion of the Kerberos service ticket using the generated hash;

transmitting, by the requesting server, the Kerberos service ticket and the Kerberos authenticator to the one of the at least two servers in the server farm;

authenticating, by the one of the at least two servers in the server farm, the requesting server responsive to receiving the Kerberos service ticket and the Kerberos authenticator;

transmitting, by the one of the at least two servers in the server farm, a Kerberos authentication reply;

transmitting, by the one of the at least two servers in the server farm, a secret to the requesting server using a session key contained in the Kerberos service ticket; and granting, by the one of the at least two servers in the server farm, membership in the server farm to the requesting server.

2. The method of claim 1, wherein receiving a name of the server farm further comprises receiving, by the requesting server, the name of the server farm, the passphrase, and the name of the server in the server farm from an administrator of the server farm.

3. The method of claim 1, wherein receiving a name of the server farm further comprises receiving a fully qualified pathname of the server farm.

4. The method of claim 1, wherein receiving a name of the server farm further comprises receiving a fully qualified pathname of the server in the server farm.

5. The method of claim 1, wherein transmitting to the server further comprises transmitting, by the requesting server, a command to start communications with the server in the server farm.

6. The method of claim 1, wherein generating a hash further comprises generating an HMAC-SHA1 keyed hash of the server farm name, the passphrase, the name of the requesting server, the name of the server in the server farm, the first nonce and the second nonce.

7. The method of claim 1, wherein generating a hash further comprises generating an HMAC-SHA-256 keyed hash of the server farm name, the passphrase, the name of the requesting server, the name of the server in the server farm, the first nonce and the second nonce.

8. The method of claim 1, wherein generating a hash further comprises generating an HMAC-MD5 keyed hash of the server farm name, the passphrase, the name of the requesting server, the name of the server in the server farm, the first nonce and the second nonce.

9. The method of claim 1, wherein transmitting the Kerberos service ticket further comprises transmitting the Kerberos service ticket and the Kerberos authenticator over Secure Sockets Layer/Transport Layer Security (SSL/TLS).

10. The method of claim 9, wherein transmitting the Kerberos service ticket further comprises using Kerberos to transmit the Kerberos service ticket and the Kerberos authenticator over Secure Sockets Layer/Transport Layer Security (SSL/TLS).

11. The method of claim 1, wherein transmitting the Kerberos service ticket further comprises transmitting the Kerberos service ticket and the Kerberos authenticator using Generic Security Services Application Program Interface (GSSAPI).

12. The method of claim 11, wherein transmitting the Kerberos service ticket further comprises using Kerberos to transmit the Kerberos service ticket and the Kerberos authenticator over Generic Security Services Application Program Interface (GSSAPI).

13. A system for requesting membership in a server farm comprising:

a receiver, executing on a computer processor provided by a requesting server belonging to a first security domain, to receive a name of a server farm comprising at least two servers, a passphrase, and a name of one of the at least two servers in the server farm;

a transmitter, in communication with the receiver, executing on the requesting server to transmit to the one of the at least two servers in the server farm a request for membership in the server farm and a first nonce, wherein the one of the at least two servers in the server farm belongs to a second security domain; and transmit a Kerberos service ticket and a Kerberos authenticator to the server in the server farm;

a generator in communication with the receiver and the transmitter, to generate a hash of the server farm name, the passphrase, the name of the receiver, the name of the one of the at least two servers in the server farm, the first nonce and a second nonce received by the receiver responsive to the acknowledgement of the request for membership in the server farm;

generate the Kerberos service ticket and the Kerberos authenticator; and encrypt a portion of the Kerberos service ticket using the generated hash; and an authenticator executing on the one of the at least two servers in the server farm, to authenticate the requesting server responsive to receiving the Kerberos service ticket and the Kerberos authenticator; and grant membership in the server farm to the requesting server; and a second transmitter executing on the one of the at least two servers in the server farm to transmit a Kerberos authentication reply; and transmit a secret to the requesting server using a session key contained in the Kerberos service ticket.

14. The system of claim 13, wherein the receiver receives a fully-qualified pathname of the server farm.

15. The system of claim 13, wherein the receiver receives a fully-qualified pathname of the server in the server farm.

* * * * *